United States Patent Office.

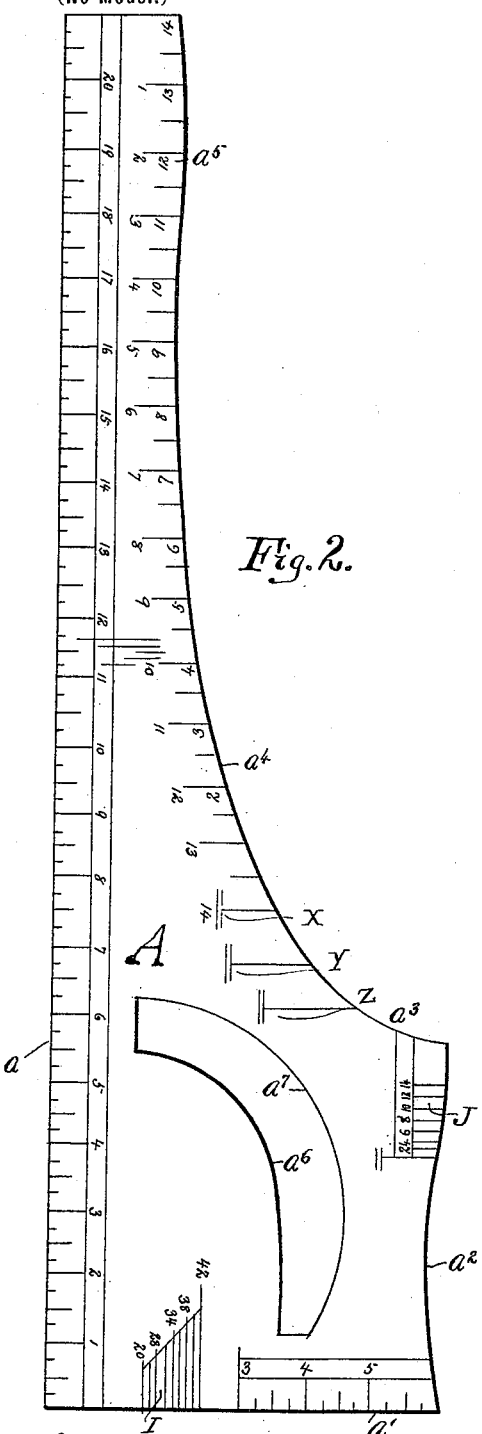

ZELDA G. SHELTON, OF ROCKYFORD, COLORADO.

DRESS-CHART.

SPECIFICATION forming part of Letters Patent No. 641,411, dated January 16, 1900.

Application filed June 20, 1899. Serial No. 721,223. (No model.)

*To all whom it may concern:*

Be it known that I, ZELDA G. SHELTON, a citizen of the United States, residing at Rockyford, in the county of Otero and State of Colorado, have invented certain new and useful Improvements in Dress-Charts, of which the following is a specification.

The object of this invention is to provide a chart for accurately drafting children's and ladies' garments which shall be very simple in construction and of peculiar shape to give all the curves and measurements required in cutting and fitting dresses, the device being in compact form and provided with a number of different scales properly proportioned to coact with the particular shape of the chart and simplify the operation of cutting out and fitting garments of different sizes.

The invention therefore consists in the peculiar shape of the chart in connection with the scales thereon coacting with the curves presented by the shape of the chart, as hereinafter fully described, and specifically set forth in the appended claim.

Figure 1 is a plan view of a drafting-chart constructed in accordance with my invention. Fig. 2 is a similar view showing the scales on the opposite side of the chart.

In carrying out my invention I construct the chart A of wood, celluloid, vulcanized rubber, or other suitable light material, the said chart being essentially of the shape or configuration shown in the accompanying drawings and hereinafter described for the purpose of accurately marking out or drafting the different parts of ladies' and children's garments. To this end one side edge and the base of the chart (designated by the letters $a$ and $a'$, respectively) are straight and extend at right angles from each other, as shown, while the other side edge of the chart extends in a compound curve $a^2$ for a comparatively short distance from the base-line $a'$, at the end of which said side edge is curved inward, quickly at first, as at $a^3$, then gradually, as at $a^4$, running to near the top, where it is curved slightly outward, as shown at $a^5$. In the wide lower portion of the chart is formed an opening which gives a curved line $a^6$ for marking out the neck-curve and an opposite curved line $a^7$ for marking out the arm-size curve.

These different edges provide for marking out the different parts of a garment and are used in connection with scales properly proportioned for different measurements and positioned to coact with the aforesaid edges of the chart.

Upon one side of the chart, as illustrated in Fig. 1, is a scale B, located at the angle of the chart and designed to give measursments in square inches, and adjoining this scale, on the base-line $a'$, is a scale C, running from "20" to "42" and coacting with a scale D to give neck measurements, and for this purpose the latter scale also runs from "20" to "42," but the graduations are differently spaced. The scales C and D coöperate with the neck-curve $a^6$, for, after indicating the measurements by the said scales, the edge $a^6$ is employed to mark out the neck-opening of a garment. At the straight edge $a$ is also a scale E, located the proper distance from base-line $a'$ and running from "20" to "42" and designed to give the width of the front piece of a waist at the bust, said scale having a different set of measurements $e$, from "1½" to "3¼," to determine the size of first side body at bust and also the size of first side body at the waist. Beyond the aforesaid scale is a scale F with two sets of measurements, as shown, to mark off the measurements of the second side body at the bust, while scale G is to mark off for the same piece at the waist. At the edge $a^4$ is a scale H, giving the measurement and providing for marking out the shoulder-curve. The edge $a^2$ of the chart is also provided with a scale, and the curve provides for marking out the shoulder at top. On the other side of the chart, Fig. 2, is a scale I, located the proper distance from the corner of the angle to give the measurement for the back part of the neck-opening. Scale J is intended to give the width of the darts, and in this scale each graduation is equivalent to two inches and corresponds with the difference between the bust and waist measures. The upper part of the curved edge at $a^5$ shapes the darts and is also used for shaping other parts of waists. On this side of the chart the long straight edge is marked off in inches and fractions of inches, beginning at the angle, and the long curve of the opposite edge is also marked off in inches and fractions and is provided with scales running in both directions, as shown.

After obtaining the measurements for the back piece of a waist the under-arm curve is obtained from the curved edge of the chart, beginning at the point X, Y, or Z, according to the fullness of the form.

A chart constructed as hereinbefore described and provided with the different scales, arranged as shown, provide for quickly and accurately marking out the different parts of a garment after the usual measurements have been taken from the body. The chart is in a simple and compact form, and it is contemplated to furnish with each chart directions for taking the measurements from the body and marking out the different parts of the garment by the aid of the chart.

Having thus described my invention, what I claim as new, and desire to secure by Letters Patent, is—

A chart for drafting garments having a side edge $a$, and base-line $a'$ extending from each other at right angles, the other side edge of the chart forming a compound curve $a^2$, a quick inward curve $a^3$, gradual curve $a^4$ and outward curve $a^5$, while the body of the chart is provided with an opening presenting a neck-curve $a^6$ and opposite arm-size curve $a^7$; together with the scales on opposite sides of the chart and arranged with respect to the edges of the chart in the manner shown and described.

In testimony whereof I affix my signature in the presence of two witnesses.

ZELDA G. SHELTON.

Witnesses:
NANCY JANE MALTBY,
R. S. BEALL.